Figure 1:
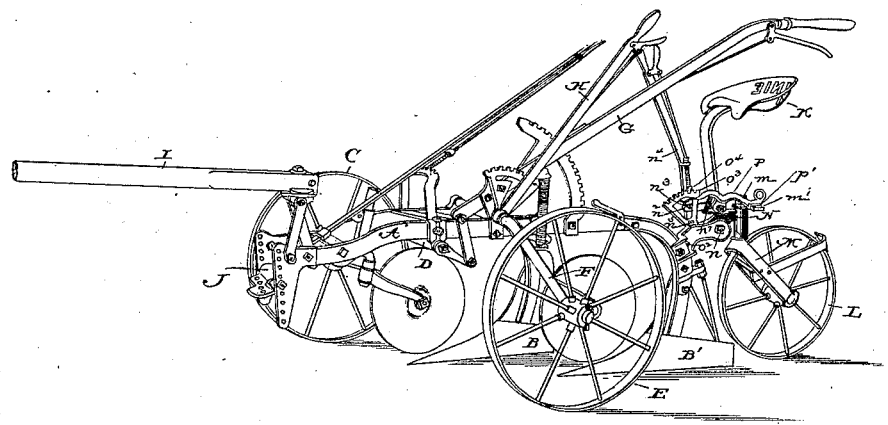

(No Model.)

A. LINDGREN.
WHEEL ATTACHMENT FOR PLOWS.

No. 421,410. Patented Feb. 18, 1890.

Attest:
W. W. Mortimer
W. R. Kennedy

Inventor:
Aug. Lindgren
By his Atty
Phil. T. Dodge

UNITED STATES PATENT OFFICE.

AUGUST LINDGREN, OF MOLINE, ILLINOIS, ASSIGNOR TO THE MOLINE PLOW COMPANY, OF ILLINOIS.

WHEEL ATTACHMENT FOR PLOWS.

SPECIFICATION forming part of Letters Patent No. 421,410, dated February 18, 1890.

Application filed July 12, 1889. Serial No. 317,339. (No model.)

*To all whom it may concern:*

Be it known that I, AUGUST LINDGREN, of Moline, in the county of Rock Island and State of Illinois, have invented certain Improvements in Wheel Attachments for Plows, of which the following is a specification.

My invention relates to a third wheel for two-wheeled or sulky plows; and it consists in the combination, with said swiveling third wheel, of means for connecting the same with the plow so that it may be locked at will against the swiveling motion and the plow-frame adjusted vertically in relation thereto.

I am aware that plows have been provided with swiveling wheels and means for locking the same against lateral or swiveling motion; and I am also aware that plow-frames have been variously connected with ground-wheels to admit of their vertical adjustment; but I believe myself to be the first to combine with a plow-frame and a swiveling wheel intermediate connections which admit of the frame being adjustable vertically, and which also admit of the wheel being locked and unlocked at will.

In the drawings I have illustrated my attachment in its preferred form adapted for application to existing two-wheeled plows; but it will be apparent to the skilled mechanic, in the light of the following specification, that the details of construction may be variously modified without changing essentially the mode of action or passing beyond the limits of my invention.

Figure 2:
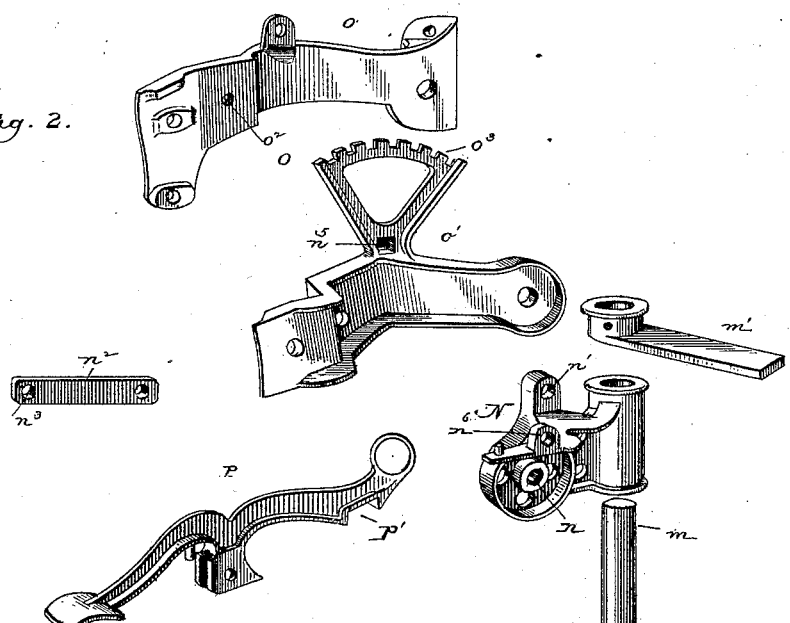

In the accompanying drawings, Figure 1 is a perspective view of a plow having my improvement applied thereto. Fig. 2 is a perspective view showing the several parts of the wheel-carrying mechanism disconnected.

Referring to the drawings, A represents the rigid metal main frame, provided with plows B B′, fixed firmly thereto. The frame is supported at the furrow side by the front furrow-wheel C, mounted on one end of a cranked axle D, and is supported at the land side by the wheel E, mounted on the cranked axle F. The two axles, seated in bearings in the main frame, are connected through intermediate devices with each other and with hand-levers G H, by means of which the frame is raised and lowered. The frame is provided at the front with a tongue or draft-pole I and a draft-head J.

The foregoing parts are all of ordinary construction and arrangement, and as they constitute no part of my invention a further description thereof is deemed unnecessary.

Referring now to my improvement, L represents my third wheel, intended to travel in the furrow behind the rear plow. It is mounted in the swiveling or laterally-swinging fork M, which latter is provided at its upright end with a vertical journal $m$, seated in a socket in the rear end of a casting N. This casting, of the form shown in Fig. 2, is carried by a horizontal pivot $n$ in the rear end of a clamp O, secured rigidly to the beam of the rear plow, forming part of the main frame. This clamp may be of any suitable form adapted to carry the operative parts and to be firmly secured to the frame. It is preferably constructed, however, as shown in Fig. 2, of two complementary parts $o$ and $o'$, connected by a cross-bolt $o^2$ and adapted to embrace the flange of the beam between their forward ends. The casting N is connected by a pivot $n'$ to one end of a link $n^2$, which is in turn pivoted at $n^3$ to a hand-lever $n^4$, the latter being in turn pivoted to the clamp O at $n^5$. As the lever is moved forward and backward it acts through the link to rock the casting N on its horizontal pivot, and thereby change the position of the wheel-carrying fork, so as to raise or lower the frame in relation to the wheel.

The parts are locked in position to maintain the vertical adjustment by means of a notched plate $o^3$, formed on the plate $o'$, and receiving a dog $o^4$, which is mounted on the hand-lever and actuated by a thumb-latch, as usual.

The foregoing parts constitute a complete and operative mechanism for raising and lowering the frame in relation to the swiveling wheel.

In order to lock the wheel against the swiveling motion and prevent this locking action and the adjusting action from interfering with the other, I provide the journal of the wheel carrying fork with a rigid lateral arm $m'$ and pivot to an ear $n^6$ on the rocking plate N a locking-lever P, such as shown in Fig. 2. The pivot of the lever is located at its middle, and it is formed at one end with a notch $p'$ in the lower edge to engage the arm $m'$, while at the opposite end it is suitably fashioned to admit of its being depressed by the operator's foot, in order that it may disengage from the arm and release the wheel. A spring $n^7$ insures the automatic engagement of the latch with the arm whenever the wheel L is straightened or brought in line with the course of travel by the advance of the machine.

A driver's seat K is bolted firmly to the member $o$ of the rigid clamp in such position that its occupant may conveniently operate the hand-lever and the latch.

It is to be noted that the latch to prevent the swiveling action is mounted upon and moves with the rocking block which carries the wheel to effect the vertical adjustment, and that consequently the wheel and the latch retain their relative positions to each other, notwithstanding the vertical adjustment of the frame. During the action of the plow the wheel remains in its locked condition, so that it assists in properly guiding the plow. When, however, the end of the furrow is reached and the plow is to be turned, the operator, depressing the forward end of the latch with his foot, thereby releases the wheel, which is allowed to swing laterally, so that the plow may be readily turned upon the main wheels.

Having thus described my invention, what I claim is—

1. The wheel attachment for plows, comprising a clamp or support O, the socket-plate connected thereto by a horizontal pivot, the hand-lever and its locking device to adjust and hold the socket-plate, the wheel-carrying fork swiveled in the socket-plate, and the latch on the socket-plate to lock the fork against the swiveling motion.

2. The beam having the mold-board plow fixed thereto, in combination with sustaining-wheels at its forward end, the swiveling furrow-wheel in rear of the mold-board, devices, substantially as shown, under the control of the driver, connecting said furrow-wheel with the rear end of the beam and adapted to raise and lower the latter, and an independently-operating latch, also under the control of the driver, to lock the furrow-wheel against its swiveling action, whereby the wheel may be locked or unlocked at will without affecting the depth of the plow.

3. In a wheel-plow, the combination, with the plow-beam having the mold-board plow at its rear end and sustained at its forward end by the ground-wheels, of the caster-wheel attached to and arranged to support the said rear end of the plow-beam and vertically adjustable with relation thereto, suitable connections for effecting the adjustment, and the latch for locking the said caster-wheel against its swiveling action, said latch being movable with the wheel and independent of the plow-beam, whereby the adjustment of the wheel operates to change the depth of the furrow, at the same time permitting the locking or unlocking of the caster-wheel, as desired.

In testimony whereof I hereunto set my hand, this 1st day of June, 1889, in the presence of two attesting witnesses.

AUGUST LINDGREN.

Witnesses:
S. M. HILL,
W. V. RICHARDS.